(12) United States Patent
Poijärvi et al.

(10) Patent No.: US 7,615,199 B2
(45) Date of Patent: Nov. 10, 2009

(54) METHOD FOR THE RECOVERY OF VALUABLE METALS AND ARSENIC FROM A SOLUTION

(75) Inventors: Jaakko Poijärvi, Ulvila (FI); Raimo Nupponen, Espoo (FI); Tuula Mäkinen, Espoo (FI); Jaana Romppanen, Helsinki (FI)

(73) Assignee: Outotec Oyj, Espoo (FI)

( * ) Notice: Subject to any disclaimer, the term of this patent is extended or adjusted under 35 U.S.C. 154(b) by 24 days.

(21) Appl. No.: 11/918,889

(22) PCT Filed: Apr. 25, 2006

(86) PCT No.: PCT/FI2006/000131

§ 371 (c)(1),
(2), (4) Date: Oct. 19, 2007

(87) PCT Pub. No.: WO2006/117424

PCT Pub. Date: Nov. 9, 2006

(65) Prior Publication Data

US 2009/0022639 A1 Jan. 22, 2009

(30) Foreign Application Priority Data

May 3, 2005 (FI) ................... 20050471

(51) Int. Cl.
*B01D 11/00* (2006.01)
*B01D 15/04* (2006.01)
*C22B 11/00* (2006.01)
*C22B 3/20* (2006.01)
*C22B 3/44* (2006.01)
*C01G 28/00* (2006.01)

(52) U.S. Cl. ................ 423/24; 423/23; 423/27; 423/34; 423/37; 423/42; 423/43; 423/87

(58) Field of Classification Search .............. 423/23, 423/24, 27, 34, 37, 42, 43, 87
See application file for complete search history.

(56) References Cited

U.S. PATENT DOCUMENTS

| 4,572,822 A * | 2/1986 | Abe et al. ............... 423/37 |
| 6,406,676 B1 | 6/2002 | Sundkvist |
| 7,314,604 B1 * | 1/2008 | Harvey et al. ............ 423/87 |

FOREIGN PATENT DOCUMENTS

CA 2384664 A1 4/2001

OTHER PUBLICATIONS

Wang et al, "Arsenic fixation in metallurgical plant effluents in the form of crystalline scorodite via a non-autoclave oxidation-precipitation process", Mar. 1, 2000, Annual Meeting for the Society for Mining, Metallurgy and Exploration, pp. 225-237.*

Q. Wang et al., "Arsenic Fixation in Metallurgical Plant Effluents in the Form of Crystalline Scorodite via a Non-Autoclave Oxidation-Precipitation Process", Minor Elements 2000, pp. 225-237, Society for Mining, Metallurgy, and Exploration, Inc.

(Continued)

*Primary Examiner*—Roy King
*Assistant Examiner*—Xiaobei Wang
(74) *Attorney, Agent, or Firm*—Buchanan Ingersoll & Rooney PC

(57) ABSTRACT

The invention relates to a method for the treatment of material containing at least one valuable metal and arsenic to form a valuable metal-depleted scorodite sediment and a pure aqueous solution to be discharged from the process. According to the method, the valuable metals are first removed from the material to be treated and then arsenic precipitation from the solution is performed in two stages. By means of the method, the aim is to obtain as low a valuable metal content as possible in the scorodite sediment that will be formed. Likewise, the arsenic and valuable metal content of the aqueous solution that is formed during arsenic precipitation also remains so low that the water can be released into the environment.

14 Claims, 1 Drawing Sheet

OTHER PUBLICATIONS

W. Qiankun et al., "A Novel Hydrometallurgical Process for the Immobilization of Arsenic", Proceedings of the Third International Conference on Hydrometallurgy, Kunming, China, Nov. 1998, pp. 543-553, International Academic Publishers, The People's Republic of China.

G.P. Demopoulos et al., "Options for the Immobilization of Arsenic as Crystalline Scorodite", Impurity Control and Disposal in Hydrometallurgical Processes : International Symposium : 24th Annual Hydrometallurgical Meeting, Quebec, Canada, 1994, pp. 57-69, The British Library.

* cited by examiner

METHOD FOR THE RECOVERY OF VALUABLE METALS AND ARSENIC FROM A SOLUTION

BACKGROUND

1. Field

Disclosed herein is a method for the treatment of material containing at least one valuable metal and arsenic to form a valuable metal-depleted scorodite sediment and a pure aqueous solution to be removed from the process. According to the method, the valuable metals are first removed from the material to be treated and then arsenic precipitation from the solution is performed in two stages. The aim is to use the method to obtain as low a valuable metal content as possible in the scorodite sediment that will be formed. Likewise, the arsenic and valuable metal content of the aqueous solution that is formed during arsenic precipitation also remains so low that the water can be released into the environment.

2. Description of Related Art

Arsenic appears in nature in many different formations. Very commonly arsenic appears with iron and copper, but also with nickel, cobalt, gold and silver. Arsenic is also the most important impurity to remove during recovery of non-ferrous metals. During pyrometallurgical processes the majority of arsenic remains in the fly ash of the waste heat boiler and electric furnace. The utilisation of arsenic has not grown in relation to its recovery, so the majority of arsenic has to be stored in the form of waste. Since arsenic and its compounds are toxic, they must be turned into as poorly soluble a form as possible before they are removed from the process. The less soluble arsenic compounds in the neutral pH zone are for instance zinc, copper and lead arsenates, but the binding of arsenic to these valuable metals is not under serious consideration, specifically because of the valuable metal content that remains in the waste. One current arsenic precipitation method that is frequently used is to precipitate arsenic with iron as ferric arsenate, which is fairly insoluble. In particular, the crystalline form of ferric arsenate, scorodite, $FeAsO_4 \cdot 2H_2O$, is less soluble than its other form, amorphous ferric arsenate. One arsenic recovery method is described in CA patent application 2384664, which presents a method for the recovery of arsenic from an acidic solution that also contains copper and divalent and trivalent iron. Arsenic precipitation is performed in one stage, wherein the stage comprises several stirred tank reactors into which air is passed. The temperature of the reactors is held in the range of 60-100° C. to prevent the co-precipitation of copper. In order to precipitate the ferric arsenate, a neutralizing agent is fed into the reactors, helping to maintain the pH value between 1.5-1.9. The precipitated ferric arsenate is recycled to the first reactor and ferric arsenate compounds are fed into the solution as seeds. Arsenic recovery is connected to sulphidic concentrate leaching, which occurs by means of trivalent iron. The solution from concentrate leaching is routed to the arsenic removal described above, and the solution exiting arsenic removal is routed in turn to copper extraction.

U.S. Pat. No. 6,406,676 describes a method for removing arsenic and iron from an acidic solution that is generated in the hydrometallurgical treatment of concentrate. Arsenic and iron precipitation are performed in two steps, where the pH is kept in the range of 2.2-2.8 in the first precipitation step and between 3.0-4.5 in the second step. Lime is added to both precipitation steps and in addition air is injected in the second step. Each step produces its own iron-arsenic residue, and the residue from the second step is recycled to the first step where any unreacted lime can be exploited in the first stage. The residue from the second step can also be recycled to the beginning of the same step to improve the crystallisation of the residue. According to the example, the method is applicable for a zinc-containing solution and it is stated that zinc is not precipitated with the iron and arsenic, but can be recovered after this treatment.

The article by Wang, Q. et al entitled "Arsenic Fixation in Metallurgical Plant Effluents in the Form of Crystalline Scorodite via a Non-Autoclave Oxidation-Precipitation Process", Society for Mining Metallurgy and Exploration, Inc, 2000, describes a method for removing arsenic from fly ash, in which arsenic is recovered as scorodite. The first treatment stage of the arsenic-containing material is the oxidation of trivalent arsenic (As(III)) into pentavalent arsenic (As(V)) with a gas containing sulphur dioxide and oxygen in oxidising conditions, in which arsenic does not precipitate. After this, arsenic is precipitated in atmospheric conditions, in which the Fe(III)/As(V) mole ratio is specified as 1. Precipitation is carried out either in one or several stages, but precipitation as scorodite demands the over-saturation of the solution, which is achieved by recycling scorodite crystals to the first precipitation reactors and simultaneously neutralising the suspension. A beneficial pH range is around 1-2 and this is maintained by feeding a suitable neutralising agent into the precipitation stage. In these conditions, arsenic can be precipitated to the level of 0.5 g/l. The final arsenic removal to a level below 0.1 mg/l is done by means of a second purification stage, in which the iron and arsenic Fe(III)/As(V) mole ratio is adjusted to a value in a range of 3-5 and the pH to a value between 3.5-5. The amorphous precipitate generated in this stage is routed back to the first precipitation stage, where it dissolves and precipitates again as scorodite. It is stated in the article that if valuable metals are present in the solution, they can be recovered after arsenic precipitation.

The tests described in the article mentioned above give a good understanding of arsenic precipitation, but in all the tests carried out, arsenic precipitation was done first and recovery of valuable metals afterwards. The disadvantage of these methods is that water-soluble valuable metals originating from an alkaline solution remain in the ferric arsenate residue precipitated from the solution containing valuable metals, and cannot be recovered even after thorough washing.

SUMMARY

There remains a need in the art for a process that eliminates the drawbacks that have appeared in the methods described above and thus to achieve a better recovery of valuable metals. In the method described herein, the recovery of valuable metals such as copper from the material to be treated is carried out first and arsenic removal is performed after this, so that in addition the concentration of the valuable metals and arsenic in the aqueous solution to be removed from the process is made so low that it can be discharged into the environment.

Disclosed herein is a method for treating material that contains at least one valuable metal and arsenic, and the purpose is to produce a scorodite residue that can be stored, which has a low valuable metal content, and a pure aqueous solution that can be removed from the process. A dilute acidic solution is formed of a material containing a valuable metal and arsenic and first at least one valuable metal is removed from the solution by means of liquid-liquid extraction and/or precipitation, after which the valuable metal-depleted solution is routed to two-stage arsenic removal. In the first stage of arsenic removal the majority of the arsenic in the solution is precipitated as scorodite $FeAsO_4 \cdot 2H_2O$ and the solution exiting precipitation is routed to the second precipitation stage, in which the rest of the arsenic is precipitated as amorphous ferric arsenate, which is recycled to the first precipitation stage. The arsenic content of the aqueous solution removed from the precipitation stage is in the range of 0.01-0.2 mg/l.

According to one preferred embodiment is disclosed herein, the material containing a valuable metal and arsenic is the fly ash formed in the pyrometallurgical treatment of non-ferrous metals.

According to another embodiment disclosed herein, the material containing a valuable metal and arsenic is the calcine formed in pyrometallurgical treatment of non-ferrous metals.

According to one embodiment disclosed herein, at least some of the dilute acid used in leaching material which contains a valuable metal and arsenic is the arsenic-containing dilute acid generated in the treatment of non-ferrous metals. Such is for instance the dilute acid generated in scrubbing arsenic-containing gases. The acid is preferably sulphuric acid, with a concentration of 10-200 g/l.

According to one preferred embodiment disclosed herein, the valuable metal to be recovered is copper.

In an embodiment disclosed herein, the Fe/As mole ratio in the first arsenic precipitation stage is adjusted to be between 1-1.1 and an oxidant is fed into the stage to oxidise the arsenic to pentavalent and the iron if necessary to trivalent, the pH of the stage is adjusted to between 1-2 and the temperature to between 85-135° C. in order to precipitate the arsenic as scorodite. The Fe/As mole ratio is adjusted by means of arsenic analysis and/or by adjusting the ratio of the solution streams. The pH adjustment is carried out preferably by means of limestone or lime. The scorodite formed in the precipitation stage is recycled to the front end of the precipitation stage to form seed crystals.

The overflow solution exiting the thickening of the first precipitation stage is routed to the second precipitation stage, in which the Fe/As mole ratio is adjusted to be over three, the pH value to between 4-7 and the temperature to between 40-6020 C. in order to precipitate the arsenic as amorphous ferric arsenate. The Fe/As mole ratio is adjusted by adding divalent or trivalent iron into the precipitation stage and the pH adjustment is preferably carried out by means of lime.

DETAILED DESCRIPTION OF SPECIFIC EMBODIMENTS

Figure 1:
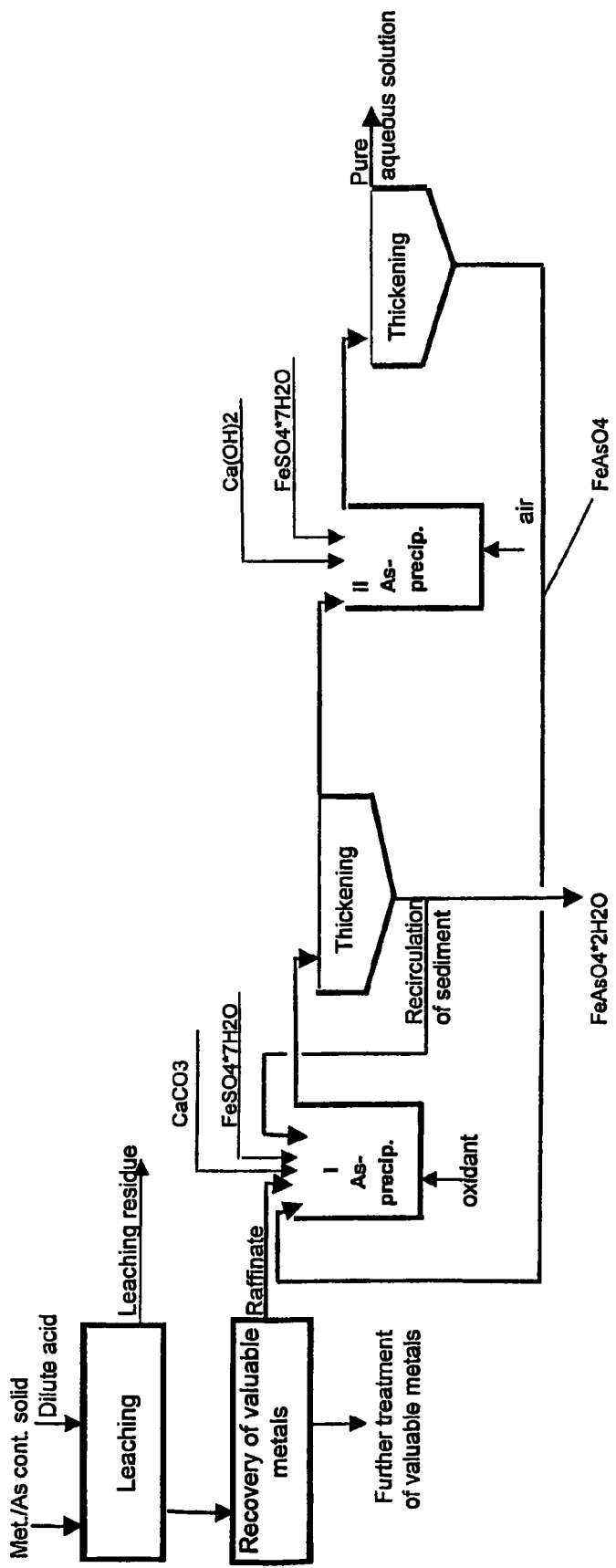
FIG. 1 presents a diagram of an embodiment of the method described herein.

Disclosed herein is to a method for the treatment of material containing a valuable metal and arsenic, whereby the valuable metals are first removed from the material and then the arsenic as poorly soluble scorodite. The material to be treated may be for example the fly ash generated in the pyrometallurgical treatment of non-ferrous metals or a calcine that contains for instance copper, iron and arsenic. As a result of both pyrometallurgical and hydrometallurgical treatment an arsenic-containing dilute acid may also be generated, having a low valuable metal content, but its treatment may be combined with the treatment of other arsenic-containing solids such as dust. Such is for instance the dilute acid generated in scrubbing arsenic-containing gases.

FIG. 1 presents the principle diagram of the process described herein. It is worth noting that although fly ash is specifically mentioned in the description below, the treatment described herein is also highly suitable for treating other arsenic-containing material.

Where fly ash generated during the fabrication of non-ferrous metals is concerned, the majority of it is sulphate-based, so it dissolves easily in the leaching stage into a dilute acid such as dilute sulphuric acid, preferably with a concentration of 10-200 g/l. If some of the valuable metals in the fly ash are in sulphide form, leaching can be intensified by feeding oxygen-containing gas into the leaching stage (not shown in detail in the diagram). When leaching is carried out using the arsenic-containing dilute acid formed in the process, arsenic recovery can be performed simultaneously from two different intermediate products. In leaching performed in stirred tank reactors in atmospheric conditions, almost all of the arsenic and the majority of the copper dissolves, and about half of the iron. The concentrations of the various metals in this kind of solution are typically in the following range: 20-40 g of copper, iron and arsenic per liter. The metal-containing leaching residue is recycled back for instance to pyrometallurgical treatment of non-ferrous metal production.

The acidic aqueous solution containing valuable metals and arsenic is first routed to the valuable metal recovery stage. When the most important valuable metal in the fly ash is copper, copper removal is performed first. Copper removal is preferably made by means of liquid-liquid extraction, where the copper-rich aqueous solution obtained from stripping is routed to electrolysis. The acid concentration of the aqueous solution entering extraction is for example 30 g/l $H_2SO_4$ and the copper concentration 20 g/l. Over 97% copper is recovered via extraction and electrolysis.

The remainder of the copper, which is not recovered in extraction, can if necessary be removed from the aqueous solution of extraction i.e. the raffinate, by sulphide precipitation for example. Sulphide precipitation is carried out preferably in two stages using hydrogen sulphide gas or some suitable hydroxide as neutralising agent. In the first stage the pH value is adjusted to be between 1.5-2 and in the second stage to 2-2.5. If the amount of copper is too small, in other words if it is only a matter of e.g. dilute acid formed in the process, sulphide precipitation is sufficient as the only form of copper recovery.

According to the method, arsenic is precipitated from a solution free of valuable metals in two stages. When the intermediate product that contains arsenic is fly ash, iron is in its aqueous solution in order to precipitate arsenic as scorodite $FeAsO_4.2H_2O$, but if there is insufficient amount of iron, it is added to the precipitation stage. The arsenic in the solution exiting copper recovery is mostly trivalent. An oxidant is routed to the first stage of precipitation, which is strong enough to oxidise all the arsenic to pentavalent. The iron in the solution is trivalent. The oxidant used may be for instance oxygen, hydrogen peroxide or another suitable oxidant. Arsenic precipitation occurs in accordance with the following formula:

$$Fe^{3+}+H_3AsO_4+H_2O \rightarrow FeAsO_4 2H_2O_{(solid)}+3\ H^+ \qquad (1)$$

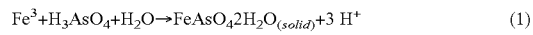

As the formula shows, arsenic precipitation forms acid in the solution and this must be neutralised. The preferred neutralising agent is limestone or lime. As mentioned in the description of the prior art, the Fe(III)/As(V) mole ratio should be around 1-1.1 in the first precipitation stage, the pH value between 1-2 and the temperature in the range of 85-135° C. The correct iron/arsenic ratio is formed by arsenic analysis and ratio control of the solution streams. In the precipitation stage, which occurs in several consecutive stirred reactors although only one reactor is shown in the flow chart, the scorodite crystals formed are recycled as underflow from the tail end of the stage, particularly from thickening, into the first reactor to ensure that the reaction proceeds.

Typically the amount of arsenic in the solution entering arsenic removal is around 20-30 g/l and the arsenic concentration of the solution removed from the process may be a maximum of 0.2 mg/l. In the first precipitation stage the arsenic concentration of the solution falls to a value of around 0.1-1 g/l. The rest of the arsenic is precipitated in the second precipitation stage, in which the Fe(III)(As(V) mole ratio is adjusted to be over three. The adjustment usually occurs by adding ferrous or ferric iron to this precipitation stage. If divalent iron is added as in the diagram, it is oxidised with air to trivalent. The pH value is adjusted to the range 4-7, preferably using lime as neutralising agent. The temperature of the second precipitation stage can be adjusted to be lower than the temperature of the first stage, to about 40-60° C. Since the conditions differ from those of the first precipitation stage, the arsenic residue generated is not scorodite, but amorphous ferric arsenate. The residue separated from thickening after the second precipitation stage is recycled to the first precipitation stage, in which conditions it dissolves and the arsenic is precipitated again as scorodite. The arsenic concentration of the aqueous solution removed from the second precipitation stage is typically around 0.01-0.2 mg/l, in other words the solution meets environmental requirements and can be discharged from the process, since the valuable metals have been removed from the solution earlier.

EXAMPLES

Example 1

Dusts from a copper smelter are leached into a solution containing sulphuric acid, so that the copper concentration of the solution is 20 g/l, the iron concentration 4 g/l, the arsenic concentration 15 g/l and the sulphuric acid concentration 30 g/l. The solution is routed to liquid-liquid copper extraction, after which the concentrations of the aqueous solution raffinate are as follows: Cu 0.4 g/l, Fe 4 g/l, As 15 g/l and sulphuric acid 60 g/l.

The raffinate (10 m$^3$/h), from which the valuable metals have been recovered, is routed to arsenic removal. The purpose is to precipitate the arsenic in a stable form suitable for landfill (as scorodite FeAsO$_4$.2H$_2$O) and to obtain a final solution suitable for removal (As <0.01 mg/l). This takes place by means of continuous two-stage precipitation.

The solution, which includes 15 g arsenic/l, 4 g iron/l and 60 g sulphuric acid/l, is routed to the first precipitation stage, where the pH value is kept at around 1.5 by means of lime milk (CaCO$_3$ 759 kg/h). The additional iron required for scorodite precipitation is obtained with the addition of ferrous sulphate (392 kg/h FeSO$_4$.7H$_2$O) to the desired Fe/As mole ratio of 1.1. The oxidation of arsenic and iron are ensured by using hydrogen peroxide or some other suitable oxidant.

The first precipitation stage comprises three oxidation reactors connected in series, in which the temperature is maintained in the range 85-95.degree. C. and the pH value between 1-1.5. After the first precipitation stage the slurry is thickened and the overflow is routed to the second precipitation stage. Some of the underflow of the first precipitation stage (0.5 m$^3$/h, solids content 200 g/l) is recycled to the beginning of the reactor series as seed crystals. The sediment obtained, which contains 7.8% arsenic in scorodite form and 0.2% copper, is filtered and stored. Over 95% of the arsenic is precipitated in this precipitation stage and the solution now only contains 0.6 g arsenic/l.

Arsenic precipitation is continued in the second stage, which in principle is the same chain of three oxidation reactors. Neutralisation is continued with lime milk (Ca(OH)$_2$ 5 kg/h) up to a pH value of 7. The temperature is adjusted to be in the range of about 50° C. Ferrous sulphate (7 kg/h FeSO$_4$.7H$_2$O) is again added to the second precipitation stage, the iron equivalent of which is three times that of stoichiometric arsenic in order to ensure the most complete separation of arsenic possible. Air bubbles are used to oxidise ferrous iron. Arsenic is precipitated as amorphous ferric arsenate in this stage, and is then settled and returned to the first stage as underflow (0.14 m$^3$/h and a solids content of 200 g/l), where it transforms into crystalline scorodite. After this precipitation stage the solution only contains approx. 0.01 mg/l arsenic, less than 0.1 mg/l iron and less than 1 mg/l copper, and its pH value is 7. Thus the impurity level of the solution is such that it can be freely discharged from the circuit.

The invention having been described herein with reference to certain examples and specific amendments, of will be understood that those examples and specific embodiments do not limit the scope of the appended claims.

The invention claimed is:

1. A method for treating a material containing at least one valuable metal and arsenic to form a valuable metal-depleted scorodite sediment and a pure aqueous solution to be discharged, comprising:
    contacting with a dilute acid the material containing the valuable metal and arsenic to form a dilute acidic solution of components thereof;
    removing at least one valuable metal from the dilute acidic solution by liquid-liquid extraction to form a valuable metal-depleted solution;
    routing the valuable metal-depleted solution to a two-stage arsenic removal, comprising:
        in a first arsenic removal stage, precipitating arsenic as scorodite (FeAsO$_4$2H$_2$O), which is suitable for storing, and forming a first exiting solution; and
        in a second arsenic removal stage, precipitating arsenic from the first exiting solution as amorphous ferric arsenate (FeAsO$_4$), which is recycled to the first arsenic removal stage, and producing a second exiting solution, wherein the second exiting solution has an arsenic concentration of around 0.01-0.2 mg/l.

2. A method according to claim 1, wherein the material containing the valuable metal and arsenic includes fly ash generated in a pyrometallurgical fabrication of non-ferrous metals.

3. A method according to claim 1, wherein the material containing the valuable metal and arsenic includes a calcine generated in a pyrometallurgical fabrication of non-ferrous metals.

4. A method according to claim 1, wherein at least some of the dilute acid is an arsenic-containing dilute acid generated in the treatment of arsenic-containing gases.

5. A method according to claim 1, wherein the dilute acid is sulphuric acid, with a concentration of 10-200 g/l.

6. A method according to claim 1, wherein the valuable metal is copper.

7. A method according to claim 1, further comprising recovering valuable metal from the valuable metal-depleted aqueous solution, or raffinate, by sulphide precipitation after the liquid-liquid extraction.

8. A method according to claim 1, wherein the first arsenic removal stage comprises:
    adjusting an Fe/As mole ratio in the first arsenic removal stage to be around 1-1.1;
    routing an oxidant to the first arsenic removal stage to oxidise arsenic to pentavalent arsenic and to oxidise iron to trivalent iron;

adjusting pH of the first arsenic removal stage to the range 1-2; and adjusting temperature of the first arsenic removal stage to between 85-135° C.;

thereby precipitating the arsenic as scorodite.

9. A method according to claim 8, wherein the adjusting of the Fe/As mole ratio comprises analyzing the arsenic level and/or adjusting a ratio of the flow rate of input streams to the first arsenic removal stage.

10. A method according to claim 8, wherein the adjusting of the pH of the first arsenic removal stage comprises adding limestone or lime.

11. A method according to claim 8, further comprising recycling scorodite formed in the first arsenic removal stage to the first arsenic removal stage to form seed crystals.

12. A method according to claim 1, wherein the first exiting solution from the first arsenic removal stage is routed to the second arsenic removal stage, and further comprising adjusting a Fe/As mole ratio of the second arsenic removal stage to be over three, adjusting pH of the second arsenic removal stage to be 7, and adjusting temperature of the second arsenic removal stage to be 40-60° C., thereby precipitating arsenic as ferric arsenate.

13. A method according to claim 12, wherein adjusting the Fe/As mole ratio comprises adding divalent and/or trivalent iron to the second arsenic removal stage.

14. A method according to claim 12, wherein adjusting the pH of the second arsenic removal stage comprises adding lime.

* * * * *